United States Patent Office 3,814,712
Patented June 4, 1974

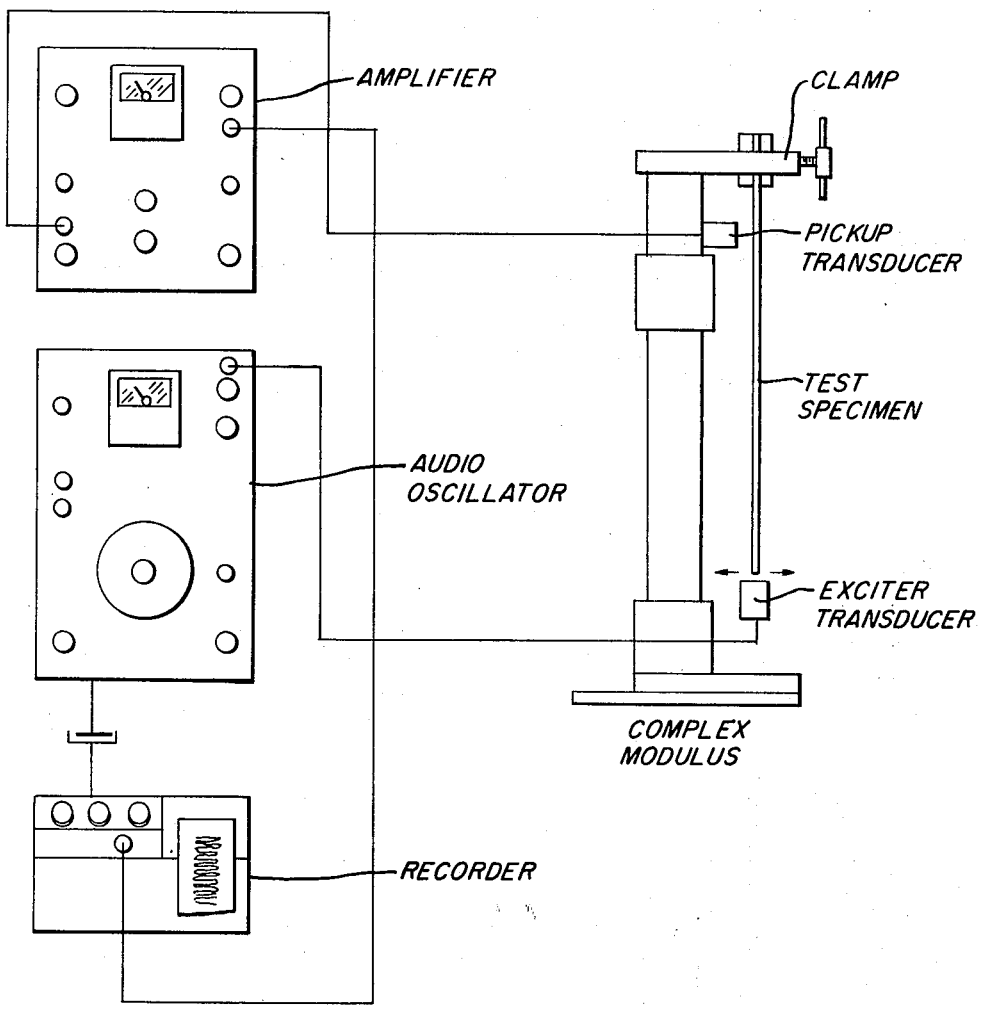

3,814,712
ADHESIVES COATINGS AND LAMINATES UTILIZING ETHYLENE COPOLYMERS AND COAL-TAR PITCH
George F. Snyder, Franklin Township, Westmoreland County, and Robert M. Stewart, Monroeville Borough, Pa., assignors to United States Steel Corporation, Pittsburgh, Pa.
Continuation-in-part of abandoned application Ser. No. 692,295, Dec. 21, 1967. This application Nov. 24, 1971, Ser. No. 201,861
Int. Cl. C08f 45/52
U.S. Cl. 260—28.5 AS
16 Claims

ABSTRACT OF THE DISCLOSURE

Thermoplastic compositions of matter comprising coal-tar pitch and a material selected from (1) a terpolymer of ethylene, vinyl acetate, and an ethylenically-unsaturated carboxylic acid and (2) a mixture of copolymers of ethylene and vinyl acetate and of ethylene and an ethylenically-unsaturated carboxylic acid, exhibiting high strength in shear and peel over a wide temperature range, are prepared and used as adhesives and coatings. Laminated materials utilizing such compositions of matter are also disclosed.

This application is a continuation-in-part of our earlier copending application, Ser. No. 692,295, filed Dec. 21, 1967, now abandoned.

BACKGROUND OF THE INVENTION

Many types of resins have heretofore been added to a coal-tar pitch to take advantage of its low cost and durability and to overcome its mechanical weakness, brittleness and poor adhesion. Thus, Downey USP 3,219,064 provides a pipe coating tape comprising coal-tar pitch, polyvinyl chloride and a plasticizer and Parkinson USP 3,361,692 provides a coating and adhesive composition comprising coal-tar pitch and an ethylenevinyl acetate copolymer. Although these as well as other prior art compositions do enhance the suitability of coal-tar pitch for use as an adhesive and coating, the resulting compositions are either too expensive or do not have sufficiently good adhesive properties to provide a generally useful composition.

Olefinic polymers are known to be inert and flexible but exhibit poor adherence to most substrates and have poor stress crack resistance. Thus, Baum, USP 3,410,928, to provide an olefinic polymer composition having increased adhesive and stress resistant properties, adds an ethylene-acrylic co- or terpolymer to his olefinic polymer to provide a printable, grease resistant composition with improved adhesion. Such compositions however have poor abrasion and heat resistance, and are therefore not suitable for use in applications where such qualities are desirable.

Coal-tar pitch and asphalt compositions have been used to coat galvanized steel culverts to improve abrasion and corrosion resistance. Asphalt dipped culvert coating is a thick (50 mils) coating obtained by dipping sections of formed culvert pipe into molten asphalt. Disadvantages associated with this coating are (1) a non-uniform coating thickness, (2) poor adhesion, (3) poor low temperature performance, (4) the coating makes the pipe sticky and difficult to handle, (5) fire hazard, (6) the size of the dip tank puts a limit on the length of culvert sections possible, (7) subject to microbial attack, and (8) hydrogen sulfide permeability, and (9) air pollution hazard.

Asbestos bonded culvert coatings are also used. Sheets of asbestos, impregnated with asphalt are bonded to steel directly following the galvanizing operation using the still molten zinc as the bonding agent. Disadvantages associated with this product are (1) its high cost, (2) dependence upon sheet galvanizing operation, (3) availability only in cut lengths not suitable for spiral wound culverts, (4) subject to microbial attack, (5) hydrogen sulfide permeable, (6) poor control of zinc coating thickness and (7) difficulties in handling and shipping, (8) fire hazard in dip tank, and (9) air pollution hazard.

Ideally, a culvert coating should possess the following characteristics: (1) excellent abrasion and corrosion resistance, (2) excellent adhesion and uniformity of coating thickness, (3) low cost, (4) suitable for coating coils for use in spiral culvert machines, (5) elimination of the dip coating step, (6) clean and easy to handle and ship, (7) hydrogen sulfide resistant, and (8) resistant to microbial attack.

SUMMARY OF THE INVENTION

We have now discovered that the addition of coal-tar pitch to an ethylene terpolymer or a mixture of two ethylene copolymers yields an adhesive and coating material that has excellent adhesive and protective properties. The addition of coal-tar pitch to the terpolymer or copolymer mixture in an attempt to lower the cost of the adhesive, surprisingly, through a synergistic effect, increased the adhesive properties of the combination to a level above that of its individual components.

We have determined that one of the copolymers must be an ethylene-vinyl acetate copolymer. The second copolymer must be an ethylene-carboxylic acid copolymer where the carboxylic acid is ethylenically unsaturated and contains from 3 to 8 carbon atoms. When the coal-tar pitch comprises about 10 to 75 weight percent of the composition, the ethylene-vinyl acetate copolymer comprises about 5 to 85 weight percent and the ethylene-carboxylic acid copolymer comprises about 5 to 85 weight percent, our novel composition exhibits surprisingly high tensile shear and peel strengths, even at temperature extremes, improved moisture resistance and resistance to bacterial attack, decreased sensitivity to dirty surfaces due to the detergent effect of the composition and allows the use of decreased extrusion pressures.

When the pitch is added to an ethylene terpolymer, the other two components of the terpolymer must be vinyl acetate and an ethylenically-unsaturated carboxylic acid containing from 3 to 8 carbon atoms. The beneficial effect of our invention is obtained when the coal-tar pitch comprises about 10 to 75 weight percent of the composition and the terpolymer comprises about 25 to 90 weight percent of the composition.

The compositions of our invention have been found to be highly useful as adhesives for both porous and non-porous materials. It is useful as a coating, especially for exterior surfaces, i.e. industrial roofing and siding, because of its insensitivity to weathering and to low or high temperatures. Surprisingly, a thin layer of our composition laminated between steel sheets was found to have pronounced vibration dampening characteristics, thus making such laminates highly useful for room partitions and other vibration dampening applications. We also contemplate laminates of the copolymer-pitch composition with galvanized or other steels to be used in coating pipe or culverts. Yet another use is as a mastic inside a polyethylene tube for coating telephone cable or other wire.

DETAILED DESCRIPTION

A pitch suitable for the purposes of the invention is preferably that derived from coal tar. Useful pitches range in ring-and-ball softening points between about 70° C. and 200° C., a preferred range being between about 100° C. and 150° C.

The ethylene copolymers with unsaturated carboxylic acids, suitable for purposes of this invention are known.

A method for preparing copolymers is disclosed in Graham et al. USP 3,132,120, issued May 5, 1964. The ethylenically-unsaturated carboxylic-acid component of the resin may comprise a monocarboxylic or dicarboxylic acid having from 3 to 8 carbon atoms such as acrylic acid, methacrylic acid, ethacrylic acid, fumaric acid, maleic acid, itaconic acid, crotonic acid and the like. Useful copolymers may vary in melt index from about 0.1 to about 400, the preferred range being between about 5 and 40. The acid content of useful copolymers may range between about 0.1% and 75% by weight of the copolymer. The acid range of commercially available copolymers with acrylic acid is between about 0.1% and 40% by weight of the copolymer. The preferred acid range of the latter is between about 2% and 20%, since above about 20% the products increase in crystallinity. In the above classification, useful commercially available ethylene-acid copolymers include Zetafin QX 3623.7 and QX 3623.24, sold by Dow Chemical Company; EAA 9000, 9300 and 9320, sold by Union Carbide Corporation; and EMA 22, sold by Monsanto Company.

The ethylene-vinyl acetate copolymers are known. A method for preparing them is disclosed in Perrin et al. USP 2,200,429, issued May 14, 1940. Useful copolymers are those having a vinyl acetate content between about 5% and 50% by weight, preferably between about 15% and 40% by weight. Useful copolymers are those having a melt index between about 0.2 and 500, preferably between about 0.5 and 175. In the above classification, useful commercially available ethylene-vinyl acetate copolymers include Elvax 40, 150, 210, 220, 240, 250, 260, 310, 350, 360, 420, 460 and EP 3710, sold by E. I. du Pont de Nemours & Company; and Co-MER EVA 303, 305, 308, 501, 505 and 508, sold by Union Carbide Corporation.

Where the terpolymer rather than the mixture of copolymers is combined with the pitch, the vinyl acetate and carboxylic acid components of the terpolymer are subject to the same limitations discussed above in relation to the ethylene copolymers. Best results are obtained when the composition is in the preferred range of about 60 to 75 weight percent ethylene, about 2 to 20 weight percent acrylic acid, and about 15 to 40 weight percent vinyl acetate.

It has been found that the broad limits for an adhesive composition comprise in percent by weight between about 10 and 75 percent of a coal-tar pitch, between about 5 and 85% of a copolymer of ethylene and vinyl acetate, and between about 5 and 85% of an ethylene-acid copolymer. Preferably, a composition of three components comprises by weight between about 25% and 50% pitch, between about 20% and 40% ethylene-vinyl acetate copolymer and between about 20% and 40% ethylene-acid copolymer.

Where the terpolymer is used the broad limits for the composition comprise in weight percent between about 10 and 75 percent of a coal-tar pitch and between 25 and 90 percent of an ethylene-vinyl acetate-carboxylic acid terpolymer. Preferably, the composition should comprise between about 25 and 50 weight percent pitch and between about 50 and 75 weight percent terpolymer.

It has been found that the above compositions, among other improved properties, showed unexpectedly large improvements in peel strength over commercially available compositions. Comparison tests were made of the peel strengths at 73° F. according to ASTM Method D903–49. For 100% Zetafin QX 3623.7 (ethylene-acid copolymer) and for 100% Elvax 260 (ethylene-vinyl acetate copolymer) the pounds of pull per inch of bond width (p.p.i.) were the same, namely, 35. For 40% pitch and 60% Elvax 260 by weight the p.p.i. was 30. When as little as 1% by weight Zetafin QX 3623.7 was included in the latter two-component composition, there was a decrease in extrusion pressure, resulting in easier processing as well as other advantages and benefits. It was found that when the percentage of Zetafin QX 3623.7 was increased, the peel strength of the composition increased until a peel strength of 90 p.p.i. was obtained with a composition comprising one third each by weight of pitch, Zetafin QX 3623.7 and Elvax 260. It is evident that while a pitch-Elvax 260 composition has fair adhesive properties, somewhat similar to those of the individual copolymers, unexpectedly enhanced or synergistic properties are found by adding an ethylene-acid copolymer to a 2-component composition comprising pitch and an ethylene-vinyl acetate copolymer. While this is an unexpected and outstanding improvement, other advantages and benefits of the compositions will be discussed hereinafter.

It has also been found that the above compositions may be made less costly or given improved properties by the addition thereto of the usual commercial filler materials, in the usual quantities. These may include aluminum silicate, talc, aluminum powder and precipitator dust, a product of a steel plant which is largely iron oxide. Broadly, up to about 40% by weight of a finely-divided filler material may be added, preferably up to about 20% by weight of the total composition.

In one embodiment of our invention, the pitch-polymer composition is laminated between two metal sheets. We prefer to laminate the materials by heating the metallic sheet to at least 400° F. and passing it and a film of the desired thickness of the pitch-polymer composition through a nip-roll. The second metal sheet is applied in like manner. Surprisingly, the composition acts not only as an adhesive but also as a visco-elastic material which exhibits vibration dampening properties. The vibration dampening laminates comprise a metallic skin, a middle visco-elastic layer and a bottom constraining layer.

A vibrating metallic member can be damped by contacting it with another material in such a way that energy is transferred and transformed into heat. The effectiveness of a sound damping material may be determined on the basis or reverberation time which is defined as the time required (in seconds) for a decrease of 60 decibels in the sound level of the specimen being tested. Materials that provide reverberation time values of 0.40 second or less are considered very effective sound and vibration dampers. The reverberation time is dependent upon (1) the thickness of the visco-elastic layer, (2) the thickness of the constraint layer, and (3) the temperature. We have discovered that when our composition is used as the visco-elastic layer between steel sheets, the laminate performs its vibration damping function when the visco-elastic layer is at least 0.008" thick, the constraining layer is at least 0.009" thick and the temperature is between 50 and 300° F. We have also determined that further improvements in the sound damping properties of the laminate are obtained up to the point where the three layers of the laminate are of equal thickness. Visco-elastic or constraining layers thicker than the base layer result in no further improvement. Best results are obtained when the visco-elastic and constraining layers are at least 0.015" thick and the temperature is between 160 and 200° F. Metals other than steel may be used as either one or both the base and constraint layers.

The pitch-polymer composition has been found useful as a water-proofing layer on concrete or steel bridge decks. In addition to serving as an adhesive to bond a bituminous hot mix wearing surface to the bridge deck, the composition is also an excellent water resistant membrane and protects the bridge deck from intrusion by salt or other water-borne corrosive agents. In this embodiment, our composition is applied as a film having a thickness of from about 20 to about 50 mils.

The pitch-polymer composition has been found to be especially suitable for use as a protective coating on steel culvert pipe. Coated metal culvert pipe is widely used in conduits for gravity drainage of water in highway, railway, airport, municipal, industrial and other installations.

The culvert pipe must have acceptable durability and resistance to material degradation from abrasion by hydraulic traffic and from corrosion and other modes of chemical or electrolytic deterioration.

Deterioration of culvert pipe metals is caused by corrosion and/or abrasion. Corrosion is the major and most persistent cause of damage: materials loss associated with corrosion usually originates on the culvert's interior surface and progresses toward the exterior surface. Experience has shown that properly applied coatings can significantly extend metal culvert pipe service life. Bituminous coating is widely used, affording protection additional to that provided by the basic galvanized coating. To be most effective, it must adhere well to the underlying metal and provide insulation from the corrosive environment. A need is indicated for the deveolpment of metal culvert pipe coatings lacking the undesirable qualities of bituminous type coatings, i.e., variable thickness and adherence, softness, high susceptibility to damage, stickiness, dirtiness in handling, fire and air pollution, etc. The composition of our invention satisfies this need. Our adhesive composition, applied to metal culvert pipe under controlled conditions as a film having a thickness of from 10 to 30 mils, preferably 15-20 mils, provides a combination of corrosion and abrasion protection superior to that given by any previous material.

Yet another embodiment of our invention is the use of our composition in the form of a tape either alone or laminated to a backing for use in coating metal pipe. Where the composition is used alone, it is preferable to wrap the tape with a material such as paper to provide pre-service protection to the pipe. Excellent results have been obtained using a paper-polyethylene-copolymer pitch resin tape. The backing for the tape may be selected from any of the conventionally used materials such as paper, resin impregnated paper, felt, or glass fiber. We prefer to use a two-component backing of paper and polyethylene. Previous pipe coating systems have required that the pipe be primed. We have now found that our novel tape can be applied to an unprimed heated pipe. We have found that temperatures in the range of 200-500° F. are suitable and most prefer temperatures in the range of 220-400° F. Best results have been obtained at 275-350° F.

The thickness of the copolymer resin composition may be varied widely. We prefer to maintain the thickness in the range of 10 to 50 mils.

The composition may also be used in the form of a tape either alone or laminated to a backing for use as an impact and abrasion resistant wrap to protect coal-tar enamel coatings applied to steel pipe. In this application, the pipe is coated with coal-tar enamel (CTE) by conventional coating equipment; however, instead of overwrapping with asbestos felt, glass mat or kraft paper, the CTE is protected by the use of our composition in the form of a tape either alone or laminated to a backing. The CTE should be applied in a thickness of about 20-90 mils, preferably about 30-50 mils. The thickness of the pitch-polymer composition may vary widely but we prefer to maintain a thickness of about 10-50 mils. The CTE, when applied at a temperature of about 400-550° F. supplies sufficient heat to bond the tape to the CTE. This bond can be strengthened by using a coal-tar-synthetic rubber primer applied to the tape.

The composition may be used in yet another method to protect steel pipe; direct extrusion coating. In this method the pipe is cleaned, then fed through a crosshead die on an extruder and a continuous sleeve of the composition is extruded around the pipe. Bonding of the coating to the pipe can be enhanced using a primer or mastic; however, we prefer to enhance the bonding by heating the unprimed pipe to about 125-400° F. before coating and after coatings, water quenching to quickly cool the pipe. Best results have been obtained using a temperature of about 150-225° F. The thickness of the coating can vary widely; however, we prefer to maintain it in the range of about 10-40 mils.

The pitch-polymer composition is also highly useful in the manufacture of laminated curtain wall panels for both interior and exterior use. In this embodiment of our invention a base layer which may be galvanized steel, aluminum coated steel, carbon steel, aluminum, thermoset reinforced plastic, or any other material adaptable for use as a curtain wall is coated with an adhesive layer of our composition. The base layer may vary widely in thickness depeending on the specific use. We have found that steel base layers of about 22–26 gage give the best results. For exterior use, galvanized steel having a zinc coating weight of about 1¼–2 oz./sq. ft. has been found to give excellent results. The adhesive and base layers are laminated by heating the base layer to a temperature of about 400–450° F. and passing the two layers through a nip-roll.

Where the difference in magnitude of coefficient of thermal expansion between the base and face layers is quite large and/or where the panel is to be used in areas of extreme temperature variation, the preferred method of applying our adhesive comprises maintaining a molten body of the adhesive above the base layer and dripping or spraying the adhesive onto the base layer. The thickness of the adhesive layer may vary widely. Thickness in the range of about 10 to 50 mils are satisfactory for most purposes, with 15 to 30 mil thicknesses being preferred.

The face layer may be applied to the two element system while still hot. Alternatively, the base-adhesive laminate may be reheated to about 400–450° F. and the face layer applied. This face layer may be a wood veneer, plywood, a plain or embossed or otherwise decorated metallic sheet, or any of a wide number of other materials.

The face layer need not be a continuous sheet. We contemplate applying aggregate to the base-adhesive laminate to give various attractive effects. Any type of aggregate may be used. River sands and gravels, traprock, marble chips, quartzite, and crushed steel mill slag are especially attractive.

If the aggregate is composed of particles varying widely in size, it is preferable to size the material into two or more fractions before application. For example, the aggregate may be sized into —½ +4 mesh size, —4 +10 mesh size and —10 mesh size fractions.

The aggregate is applied by heating the base-adhesive laminate to about 400–450° F., dropping the agreate onto the softened adhesive and running the composition through a soft rubber roller to embed the particles in the adhesive layer. The laminate is then quenched to harden the adhesive and the excess, non-adhering aggregate is removed.

A complete understanding of the invention may be obtained from the following typical examples of our process showing how the compositions are made and giving some of the properties thereof. The designated properties were determined by standard ASTM methods, more particularly, D1002–53T (tensile shear strength) and D903–49 (peel strength).

Examples 1–6

Zetafin QX 3623.7 is a commercially available proprietary copolymer of ethylene and acrylic acid. It has an acid content of about 6.8% by weight and a melt index of about 5. Elvax 260 is a commercially available proprietary copolymer of ethylene and vinyl acetate. It has a vinyl acetate content of about 28% and a melt index of about 6.

In Example 1, equal parts or percent by weight of Zetafin QX 3623.7, Elvax 260 and a coal-tar pitch having a ring-and-ball softening point of about 150° C. were mixed for 20 minutes in a twin-shell blender and then fed to an extruder preheated to between 240° and 300° F. Metering screws were used having a length to diameter ratio of 24 to 1 and a compression ratio between about 3 to 1 and 4 to 1. The mixture was extruded as a 0.010 inch thick film and test samples prepared therefrom. In Examples 2–5, the proportions of a similar pitch were varied. The tensile shear and peel strengths became appreciably lower only after about 60% pitch was used. Comparing Examples 1 and 6 using 150° C. and 110° C. pitches, respectively, the test results were a bit lower generally for Example 6. The results are tabulated in Table 1.

TABLE 1

|  | Ex. 1 | Ex. 2 | Ex. 3 | Ex. 4 | Ex. 5 | Ex. 6 |
|---|---|---|---|---|---|---|
| Components, weight percent: | | | | | | |
| Pitch 150° C | 33⅓ | 40 | 40 | 50 | 60 | |
| Pitch 110° C | | | | | | 33⅓ |
| Zetafin QX 3623.7 | 33⅓ | 20 | 40 | 25 | 20 | 33⅓ |
| Elvax 260 | 33⅓ | 40 | 20 | 25 | 20 | 33⅓ |
| Properties; tensile shear strength, p.s.i. at— | | | | | | |
| −40° F | 2,600 | 3,400 | 2,750 | 2,750 | 800 | 2,700 |
| 73° F | 1,300 | 1,200 | 1,400 | 900 | 775 | 1,000 |
| 145° F | 200 | 500 | 500 | 200 | 300 | 175 |
| Peel strength (180°) p.p.i. at— | | | | | | |
| −40° F | 45 | 2 | 30 | 40 | 25 | 40 |
| 73° F | 95 | 55 | 60 | 80 | 35 | 80 |
| 145° F | 35 | 35 | 25 | 25 | 25 | 30 |

Examples 7–11

Example 1 was repeated as Examples 7–11 to illustrate the effect on the composition of a change in the ethylene-acid copolymer. The results are tabulated in Table 2, the Example 1 results being added for comparison. More particularly, for Zetafin QX 3623.7 there was substituted Zetafin QX 3623.24, EAA 9300, EAA 9000, EAA 9320 and EMA 22 in Examples 7–11, respectively. Zetafin QX 3623.24 is an ethylene-acrylic acid copolymer having an acid content of about 6.8% and a melt index of about 40. EAA 9300 is an ethylene-acrylic acid copolymer having an acid content of about 20% and a melt index of about 50. EAA 9000 is an ethylene-acrylic acid copolymer, having an acid content of about 14% and a melt index of about 5. EAA 9320 is an ethylene-acrylic acid copolymer, having an acid content of about 16% and a melt index of about 50. EMA 22 is an ethylene-maleic acid copolymer, having an acid content of about 70%. Tensile shear and peel strengths of the respective examples varied somewhat from each other but not an appreciable extent, with the exception of Example 11. Even for Example 11 the peel strength at 73° F. of 30 is the same as for a 2-component composition of pitch and an ethylene-vinyl acetate copolymer.

TABLE 2

|  | Ex. 1 | Ex. 7 | Ex. 8 | Ex. 9 | Ex. 10 | Ex. 11 |
|---|---|---|---|---|---|---|
| Components, weight percent: | | | | | | |
| Pitch 150° C | 33⅓ | 33⅓ | 33⅓ | 33⅓ | 33⅓ | 33⅓ |
| Zeatfin QX 3623.7 | 33⅓ | | | | | |
| Zetafin QX 3623.24 | | 33⅓ | | | | |
| EAA 9300 | | | 33⅓ | | | |
| EAA 9000 | | | | 33⅓ | | |
| EAA 9320 | | | | | 33⅓ | |
| EMA 22 | | | | | | 33⅓ |
| Elvax 260 | 33⅓ | 33⅓ | 33⅓ | 33⅓ | 33⅓ | 33⅓ |
| Properties; tensile shear strength, p.s.i. at— | | | | | | |
| −40° F | 2,600 | 3,300 | 3,000 | 2,680 | 1,600 | |
| 73° F | 1,300 | 1,350 | 1,300 | 950 | 825 | 475 |
| 145° F | 200 | 450 | 450 | 85 | 15 | |
| Peel strength (180°) p.p.i. at— | | | | | | |
| −40° F | 45 | 35 | 60 | 40 | 40 | |
| 73° F | 90 | 60 | 70 | 50 | 50 | 30 |
| 145° F | 35 | 35 | 30 | 20 | 20 | |

Examples 12–14

Example 1 was repeated as Examples 12–14, to illustrate the effect on the composition of a change in the ethylene-vinyl acetate copolymers. The results are tabulated in Table 3, the Example 1 results being included for comparison. More particularly, for Elvax 260, there was substituted Elvax 360, 460 and EP 3710 in Examples 12–14, respectively. Elvax 360 has a vinyl acetate content of about 25% and a melt index of about 2. Elvax 460 has a vinyl acetate content of about 18% and a melt index of about 2.5. Elvax EP 3710 has a vinyl acetate content of about 9.5% and a melt index of about 0.8. The tensile shear and peel strengths of the respective examples varied somewhat from each other.

TABLE 3

|  | Ex. 1 | Ex. 12 | Ex. 13 | Ex. 14 |
|---|---|---|---|---|
| Components, weight percent: | | | | |
| Pitch 150° C | 33⅓ | 33⅓ | 33⅓ | 33⅓ |
| Zetafin QX 3623.7 | 33⅓ | 33⅓ | 33⅓ | 33⅓ |
| Elvax 260 | 33⅓ | | | |
| Elvax 360 | | 33⅓ | | |
| Elvax 460 | | | 33⅓ | |
| Elvax EP 3710 | | | | 33⅓ |
| Properties; tensile shear strength, p.s.i. at— | | | | |
| −40° F | 2,600 | 3,900 | 2,600 | |
| 73° F | 1,300 | 1,600 | 1,300 | 1,400 |
| 145° F | 200 | 1,000 | 250 | |
| Peel strength (180°) p.p.i. at— | | | | |
| −40° F | 45 | 55 | 45 | |
| 73° F | 90 | 70 | 80 | 60 |
| 145° F | 35 | 55 | 35 | |

Examples 15–21

Using an Example 1 composition, these examples illustrate that relatively good peel strength results may be obtained at 73° F. regardless of the substrate surface preparation of cold rolled carbon steel or galvanized steel. It should be pointed out that with all galvanized steel substrates, the adhesion was sufficient to cause the zinc coating to delaminate from the steel base. The results are tabulated in Table 4.

TABLE 4

| Examples | Surface preparation | Cold rolled carbon steel | Galvanized steel |
|---|---|---|---|
| 15 and 16 | As received from the mill | 40 | 70 |
| 17 and 18 | Wiped with an acetone wetted cloth. | 50 | 80 |
| 19 and 20 | Vapor degreased | 90 | 80 |
| 21 | Cleaned with an abrasive cleaner. | 80 | |

Examples 22–25

Example 1 was repeated as Examples 22–25 to illustrate the effect on the composition (equal weight percents of the Example 1 components) by the addition thereto of typical commercial fillers in various amounts. The results are tabulated in Table 5, the Example 1 results being included for comparison. More particularly, in Example 22, Aluminum Silicate, Grade ASP 400 provided 20% by weight of the composition, the remainder being equal weight percents (26⅔%) of 150° C. pitch, Zetafin QX 3623.7 and Elvax 260. Some of the tensile shear strength results were somewhat better and some of the peel strength results somewhat poorer than results for Example 1. In Example 23, the filler represented a mixture of 20% aluminum silicate and 2% aluminium powder. Test results were somewhat the same as for Example 22. In Example 24, steel mill precipitator dust, largely iron oxide, was used to 11% of the total composition. The test results were about the same as for Examples 22 and 23, except for a poorer peel strength at −40° F. In Example 25, talc represented 30% of the composition, the test results being somewhat similar to those obtained with other fillers.

TABLE 5

| | Ex. 1 | Ex. 22 | Ex. 23 | Ex. 24 | Ex. 25 |
|---|---|---|---|---|---|
| Components, weight percent: | | | | | |
| Pitch 150° C. | 33⅓ | 26⅔ | 26 | 29⅔ | 23⅔. |
| Zetafin QX 3623.7 | 33⅓ | 26⅔ | 26 | 29⅔ | 23⅔. |
| Elvax 260 | 33⅓ | 26⅔ | 26 | 29⅔ | 23⅔. |
| Filler | | ASP 400-20 | ASP 400-20 aluminum Powder-2. | Precipitator dust-11 | Talc-30. |
| Properties; tensile shear strength, p.s.i. at— | | | | | |
| −40° F. | 2,600 | 2,750 | 2,950 | 2,600 | 3,100. |
| 73° F. | 1,300 | 1,500 | 1,450 | 1,400 | 1,250. |
| 145° F. | 200 | 200 | 275 | 250 | 450. |
| Peel strength (180°) p.p.i. at— | | | | | |
| −40° F. | 45 | 40 | 20 | 5 | 45. |
| 73° F. | 90 | 60 | 55 | 80 | 55. |
| 145° F. | 35 | 35 | 30 | 40 | 30. |

Examples 26–28

The procedure of Example 1 was repeated in Examples 26–28 to illustrate the unexpected results obtained with a 2-component composition of an ethylene-vinyl acetate copolymer and ethylene-acid copolymer, as compared to the results obtained with the individual copolymers. The results are tabulated in Table 6, the Example 1 results being added for comparison. More particularly, 100% Elvax 260 composition was tested in Example 26, 100% Zetafin QX 3623.7 composition in Example 27 and 50% of each by weight in a 2-component composition in Example 28. Where a high peel strength is essential, the Example 28 composition results at the three temperatures were unexpectedly higher than the corresponding peel strength results for Examples 26 and 27 The unpredictability of the properties obtained with a 2-component copolymer composition as compared with the results obtained with the individual copolymers is reflected in the diverse lap shear strength properties. As previously pointed out, the 3-component composition of Example 1 had unexpectedly higher peel strength properties at the three temperatures than were obtained with the 2-component composition of Example 28 and the single-component compositions of Examples 26 and 27.

TABLE 6

| | Ex. 1 | Ex. 26 | Ex. 27 | Ex. 28 |
|---|---|---|---|---|
| Components, weight percent: | | | | |
| Pitch 150° C. | 33⅓ | | | |
| Zetafin QX 3623.7 | 33⅓ | | 100 | 50 |
| Elvax 260 | 33⅓ | 100 | | 50 |
| Properties, tensile shear strength, p.s.i. at— | | | | |
| −40° F. | 2,600 | 3,250 | 2,900 | 2,850 |
| 73° F. | 1,300 | 750 | 1,675 | 1,250 |
| 145° F. | 200 | 125 | 725 | 200 |
| Peel strength (180°) p.p.i. at— | | | | |
| −40° F. | 45 | 3 | 20 | 25 |
| 73° F. | 90 | 35 | 35 | 55 |
| 145° F. | 35 | 20 | 15 | 25 |

It will be evident from the foregoing that our invention provides desirable adhesive compositions. While these compositions are primarily adhesives, they are also useful as protective coatings, moldings, extrusions and films. Moldings, extrusions and films may be prepared in accordance with usual extrusion practices. The adhesives' resistance to moisture was shown by immersing ASTM D-903 peel test specimens in water at 73° F. for 28 days. At the end of this period no loss of peel strength was detected with carbon steel, stainless steel and galvanized steel substrates. For these adhesives, the resistance of pitch to microbial degradation was not lessened by copolymer addition.

Example 29

To show the vibration dampening effect of laminated compositions of our invention, test specimens were prepared by cleaning the metallic base and constraining layers in an alkaline solution. The base layer was heated to 420°–430° F. and the visco-elastic film was bonded to the base layer on a nip-roll. The constraining layer was placed on the visco-elastic layer and the entire panel heated to 420–430° F. and passed through the nip-roll to uniformly bond the constraining layer to the visco-elastic layer. Finally, the laminated panel was squeezed in a hot press to obtain the desired thickness of the visco-elastic layer.

In the following tests, the base and constraining layers are 0.024 inch thick cold-rolled sheet steel. Table 7 lists the sound-dampening properties for laminates having different thickness of a visco-elastic layer of the following composition:

Coal-tar pitch _____ ⅓
Ethylene-vinyl acetate copolymer (Elvax 260) _____ ⅓
Ethylene-acrylic acid copolymer (EAA 9060) _____ ⅓

The test equipment is shown in the figure. The complex modulus was located inside a bench oven, which provides acoustical insulation as well as serving as a chamber for testing of the desired temperatures. To obtain temperatures lower than room temperature, carbon dioxide was evaporated in the oven.

In the sound-dampening test, energy is induced into a test specimen that is clamped at one end and free at the other. Energy is induced at all frequencies between 20 and 20,000 Hertz and measurements are made of the energy transmitted through the specimen.

The results obtained show that excellent sound-dampening was obtained when the visco-elastic layer was approximately ⅓ the thickness of the base layer. Further improvements in the sound-dampening properties were obtained up to the point where the three layers of the laminate were of equal thickness, but visco-elastic layers thicker than the base layer resulted in no further improvement.

TABLE 7

Room-temperature sound-dampening properties for laminates with various thicknesses of visco-elastic layer (Nexus P-10(.3)

| Δ Thickness of visco-elastic layer, inch | Δf [1] | f [2] | d [3] | db [4] | RT [5] |
|---|---|---|---|---|---|
| 0 | 0.5 | 225 | *0.002 | 88.5 | 4.60 |
| 0.002 | 3 | 239 | *0.010 | 74.6 | 0.94 |
| 0.002 | 3 | 240 | *0.007 | 75.8 | 1.26 |
| 0.003 | 2 | 246 | *0.008 | 74.5 | 1.06 |
| 0.003 | 2 | 247 | *0.009 | 74.4 | 1.04 |
| 0.006 | 3 | 260 | *0.012 | 71.7 | 0.72 |
| 0.006 | 4 | 261 | *0.014 | 70.0 | 0.60 |
| 0.009 | 6 | 274 | 0.021 | 65.9 | 0.32 |
| 0.009 | 6 | 277 | 0.021 | 66.6 | 0.32 |
| 0.012 | 8 | 277 | 0.028 | 66.5 | 0.20 |
| 0.012 | 8 | 281 | 0.028 | 62.7 | 0.26 |
| 0.013 | 9 | 282 | 0.031 | 61.5 | 0.22 |
| 0.014 | 9 | 285 | 0.031 | 61.2 | 0.22 |
| 0.015 | 10 | 294 | 0.034 | 61.4 | 0.20 |
| 0.015 | 10 | 304 | 0.032 | 60.5 | 0.20 |
| 0.016 | 8 | 294 | 0.027 | 63.5 | 0.26 |
| 0.017 | 11 | 303 | 0.036 | 60.5 | 0.18 |
| 0.017 | 10 | 294 | 0.034 | 61.5 | 0.20 |
| 0.018 | 11 | 307 | 0.035 | 60.5 | 0.18 |
| 0.018 | 11 | 307 | 0.035 | 60.3 | 0.18 |
| 0.023 | 16 | 340 | 0.047 | 55.8 | 0.14 |
| 0.024 | 16 | 340 | 0.047 | 56.6 | 0.14 |
| 0.025 | 23 | 345 | 0.066 | 54.5 | *0.10 |
| 0.025 | 23 | 342 | 0.067 | 53.7 | *0.10 |
| 0.027 | 18 | 329 | 0.054 | 56.5 | 0.12 |
| 0.028 | 18 | 368 | 0.048 | 66.0 | 0.12 |
| 0.032 | 19 | 369 | 0.051 | 55.5 | 0.12 |
| 0.033 | 18 | 372 | 0.048 | 55.1 | 0.12 |

[1] Δf=Width (in Hz.) of the frequency-resonance peak at the half power points (that is, 3 db below the peak).
[2] f=Frequency (in Hz.) at the resonance peak.
[3] d=Loss factor=Δf/f.
[4] db=Amplitude (in db) of the frequency-resonance peak.
[5] RT=Reverberation time (the time, in seconds, required for a decrease of 60 db in the sound level).
*RT is calculated from Δf and f when measured RT is 0.10 second or less. d is calculated from RT and f when measured Δf is 4 Hz. or less.

Example 30

Sound-dampening laminates were prepared as in Example 29 and tested at different temperatures. Base and constraining layers were 0.024 inch thick cold rolled sheet steel. The visco-elastic layer, of the same composition as in Example 29, was 0.017 inch thick. The results are recorded in Table 8. These results show that sound-dampening between about 50 and 300° F. was excellent, the best performance being obtained between 160 and 200° F.

TABLE 8

Sound-dampening properties of laminates bonded with Nexus P-1003 at various temperatures

| T (° F.) | Δf [1] | f [2] | d [3] | db [4] | RT [5] |
|---|---|---|---|---|---|
| *Low-temperature tests* | | | | | |
| 77 | 6 | 292 | 0.020 | 65.7 | 0.32 |
| −56 | 1 | 314 | *0.004 | 84.0 | 2.00 |
| −16 | 1.5 | 311 | *0.006 | 79.2 | 1.40 |
| 45 | 5 | 303 | 0.016 | 67.8 | 0.46 |
| 75 | 6 | 294 | 0.020 | 64.7 | 0.30 |
| *High-temperature tests* | | | | | |
| 75 | 6 | 263 | 0.022 | 68.0 | 0.34 |
| 120 | 11 | 226 | 0.048 | 61.4 | 0.16 |
| 160 | 15 | 165 | 0.090 | 56.5 | 0.15 |
| 200 | 15 | 133 | 0.112 | 56.3 | 0.15 |
| 240 | 9 | 120 | 0.075 | 60.0 | 0.20 |
| 280 | 8 | 117 | 0.068 | 60.1 | 0.26 |
| 300 | 8 | 117 | 0.068 | 60.1 | 0.26 |
| 75 | 6 | 259 | 0.023 | 68.3 | 0.38 |

[1] Δf=Width (in Hz.) of the frequency-resonance peak at the half power points (that is, 3 db below the peak).
[2] f=Frequency (in Hz.) at the resonance peak.
[3] d=Loss factor=Δf/f.
[4] db=Amplitude (in db) of the frequency-resonance peak.
[5] RT=Reverberation time (the time, in seconds, required for a decrease of 60 db in the sound level).
*RT is calculated from Δf and f when measured RT is 0.10 Δf is 4 Hz. or ess.

Example 31

To show the benefits of our composition as an adhesive and water resistant layer on bridge decks, a concrete bridge deck was prepared for surfacing by removing deteriorated concrete, heavy deposits of grease and oil, loose dirt and debris and sharp protrusions by conventional methods. A rubberized adhesive and primer composition of 15% acrylonitrile-butadiene copolymer in high boiling tar oil is heated in a tar kettle to a temperature of about 300–310° F. Immeditaely thereafter the primer is applied to the bridge deck to a thickness of about 25–40 mils by pouring the material onto the bridge deck and spreading the material using a squeegee. The adhesive and water resistant membrane of our invention having the following composition:

Coal-tar pitch (150° C.) _____ ⅓
Ethylene-vinyl acetate copolymer (Elvax 260) _____ ⅓
Ethylene acrylic acid copolymer (EAA 9060) _____ ⅓ and a thickness of 40 mils is laid over the rubberized adhesive. Care is taken to overlap the sheets. The laps are sealed with small amounts of the rubberized adhesive. A bituminous binder mix is applied immediately thereafter. The mix should be at a minimum temperature of 290° F., preferably above 300° F. during installation. The compacted thickness of the bituminous layer is preferably about ¾″. The binder mix is then covered with a wearing course mix with specifications that meet local codes or requirements. Bridges paved using this procedure give a greater bond between the bituminous course and the concrete. When degradation of the bituminous course does occur, the adhesive and water resistant membrane affords protection to the concrete until corrective measures are taken.

Example 32

To show the benefits obtained from our composition in coating metal culverts, a galvanized copper bearing steel coil 16 gage x 27⅜″ wide having a 2 oz. per sq. ft. galvanized coating and meeting AASHO specification M-218 and ASTM specification A-444 was coated with a 20 mil film of our invention having the composition:

Coal-tar pitch (150° C.) _____ ⅓
Ethylene-vinyl acetate copolymer (Elvax 260) _____ ⅓
Ethylene acrylic acid copolymer (EAA 9060) _____ ⅓

The galvanized steel substrate is cleaned by conventional methods and is primed with an extremely thin (0.00025″ dry thickness) coating having the following composition:

| | Percent |
|---|---|
| Ethylene-acrylic acid copolymer (EAA 9300) | 20 |
| NH₄OH (28% NH₃) | 4.2 |
| Water | 75.8 |

The primed steel is then heated to a temperature of 400° F., and the adhesive composition is applied as a 20 mil film to the primed top surface of the hot steel by feeding it between two rubber nip-rolls. The coated steel, after laminating, is cooled by water quenching at room temperature.

The coil is made into a culvert by the spiral lock seam method by putting on a pay-off reel and passed through 11 roll forming strands to form a corrugated configuration in the coil sheet product. The corrugated sheet is then passed over a mandrel to form the spiral lock-seam culvert (24 inch diameter) which is continuously cut to the desired length of 20 feet.

Similarly the coated steel (galvanized or carbon steel) may be formed by conventional means and fabricated into silos, tanks, either for above or below ground use, tunnel liners, irrigation pipe, etc., where the composition acts as a corrosion preventive coating.

Example 33

A length of 2 inch diameter steel shot-blasted steel pipe is placed on a conventional coal-tar enamel (CTE) coating line. Seven venturi gas burners are installed ahead of the CTE coating section. The coating tape dispenser is filled with a paper-polyethylene-copolymer resin tape. This tape is 4″ wide with a 3½″ wide polyethylene coated 70# kraft paper backing (½″ exposed copolymer resin on one edge). The copolymer resin portion of the tape is 0.0095″ thick and has the following composition:

Coal-tar pitch (150° C.) _____ ⅓
Ethylene-vinyl acetate copolymer (Elvax 260) _____ ⅓
Ethylene acrylic acid copolymer (EAA 9060) _____ ⅓

The CTE line is started. The pipe advances with a spiralling motion at about 10 ft./min., is heated to about 220° F. under the gas burners and is wrapped with the tape. After air cooling, the taped pipe was examined and the tape-pipe bond rated excellent.

Example 34

This example is to show the beneficial results obtained when an ethylene-vinyl acetate carboxylic terpolymer is used in place of the mixtures of ethylene-vinyl acetate and ethylene-carboxylic acid copolymers. The procedure of Example 1 was used. The terpolymer tested had the melt index and composition set forth in Table 9. Table 10 sets forth the adhesive properties of these terpolymers alone and of a composition comprising 75% terpolymer and 25% coal-tar pitch having a ring-and-ball softening point of about 150° C.

TABLE 9

| Terpolymer No. | Melt index | Percent of— | | |
| | | Ethylene | Vinyl acetate | Acrylic acid |
|---|---|---|---|---|
| 34-1 | 12 | 69 | 21 | 10 |
| 34-2 | 9 | 71 | 24 | 5 |
| 34-3 | 54 | 66 | 29 | 5 |

TABLE 10

| Blend | Properties of terpolymer No.— | | | | | |
|---|---|---|---|---|---|---|
| | 34-1 | | 34-2 | | 34-3 | |
| | 100% terp. | 75% terp., 25% coal-tar pitch | 100% terp. | 75% terp., 25% coal-tar pitch | 100% terp. | 75% terp., 25% coal-tar pitch |
| Application conditions: | | | | | | |
| Temperature, °F | 350 | 300 | 400 | 300 | 400 | 350 |
| Pressure, p.s.i | 50 | 50 | 50 | 50 | 50 | 50 |
| Time, minutes | 30 | 30 | 30 | 30 | 30 | 30 |
| Tensile shear strength, p.s.i. at— | | | | | | |
| −40° F | >2,900 | 3,000 | >2,850 | 2,700 | >2,900 | 2,850 |
| 73° F | 1,200 | 2,000 | 1,450 | 1,900 | 1,300 | 1,300 |
| 145° F | 375 | 400 | 550 | 725 | 200 | 10 |
| Peel strength, p.p.i. at— | | | | | | |
| −40° F | | 15 | | 15 | | 30 |
| 73° F | 80 | 75 | 60 | 70 | 50 | 65 |
| 145° F | | 35 | | 35 | | 15 |
| Tensile strength, p.s.i | 1,950 | 2,050 | 2,650 | 2,850 | 800 | 1,600 |
| Elongation, percent | 600 | 500 | 675 | 625 | 750 | 600 |
| Tear resistance, p.p.i | 225 | 325 | 275 | 350 | 150 | 250 |
| Hardness: | | | | | | |
| Shore A | | 79 | | 82 | 62 | 78 |
| Shore D | 23 | 32 | 25 | 35 | 17 | 28 |

Example 35

To show the benefits of the composition when used as a curtain wall panel, test specimens were prepared by cleaning a base layer of 22 gage galvanized steel having a zinc coating weight of 1½ oz./sq. ft. and applying to it a 20 mil layer of a coating of our invention having the following composition:

Coal-tar pitch (150° C.) ⅓
Ethylene-vinyl acetate copolymer (Elvax 260) ⅓
Ethylene acrylic acid copolymer (EAA 9060) ⅓

This coating was applied to the base layer by heating to a temperature of about 420–430° F. and passing it through a nip-roll to uniformly bond the base layer to the adhesive layer. The laminate was then reheated to a temperature of 400° F. by means of radiant heater and was passed under a series of bins containing crushed steel mill slag. The first of these bins contained slag particles in the size range between plus 4 mesh and ½ inch; the second containing slag sized in the range of plus 10 and minus 4 mesh and the third, containing slag of minus 10 mesh size. The aggregate containing bins were vibrated as the laminate passed under them allowing the particles to fall through screens and onto the laminate. The aggregate containing composition was then passed through a soft rubber roller to embed the aggregate and the adhesive layer. After quenching by means of a water spray the composition was flipped over to allow any non-adhering aggregate to fall out.

The finished composition was then tested at temperatures ranging from −40° F. to 150° F. The adhesion of the three layers was not adversely affected.

We claim:

1. A composition comprising:
   (a) from about 10 to about 75 weight percent coal-tar pitch;
   (b) from about 25 to about 90 weight percent of a polymeric ethylene composition selected from
      (1) a terpolymer of about 60–75 percent by weight ethylene, 15–40 percent vinyl acetate, and 2–20 percent ethylenically-unsaturated carboxylic acid containing from 3 to 8 carbon atoms, and
      (2) a mixture of copolymers of ethylene and about 5–50 weight percent vinyl acetate and ethylene and 0.1–75 weight percent ethylenically-unsaturated carboxylic acid containing from 3 to 8 carbon atoms wherein the ethylene-vinyl acetate copolymer and the ethylene-carboxylic acid copolymer each comprise from about 5 to about 85 weight percent of the total composition.

2. The composition of claim 1 wherein the coal-tar pitch is from about 25 to about 50 weight percent of the composition, the ethylene-vinyl acetate copolymer is from about 20 to about 40 weight percent of the composition and the ethylene-carboxylic acid copolymer is from about 20 to about 40 weight percent of the composition.

3. The composition of claim 1 comprising substantially equal parts by weight of said pitch, said ethylene-vinyl acetate copolymer and said ethylene-carboxylic acid copolymer.

4. The composition of claim 1 wherein finely divided filler material is added.

5. The composition of claim 1 wherein the ethylene-carboxylic acid copolymer has an acid content of from about 0.1 percent to about 75 percent by weight.

6. The composition of claim 1 wherein the ethylene-carboxylic acid copolymer has an acid content of from about 0.1% to about 40% by weight.

7. The composition of claim 1 wherein the ethylene-carboxylic acid copolymer has an acid content of from about 2 to about 20% by weight.

8. The composition of claim 1 wherein the carboxylic acid is acrylic acid.

9. The composition of claim 8 wherein the ethylene-acrylic acid copolymer has a melt index between about 0.1 and 400 and the ethylene-vinyl acetate copolymer has a vinyl acetate content of from about 15 to about 40 weight percent and a melt index between 0.5 and 175.

10. The composition of claim 1 wherein the ethylene-vinyl acetate copolymer has a vinyl acetate content of from about 5 to about 50 weight percent.

11. The composition of claim 1 wherein the ethylene-vinyl acetate copolymer has a melt index of from about 0.2 to about 500.

12. The composition of claim 1 comprising from about 25 to about 50 weight percent pitch having a softening point between about 100 and 150° C., from about 20 to about 40 weight percent of an ethylene-acrylic acid copolymer having an acrylic acid content of from about 2 to about 20 weight percent and a melt index between about 5 and 40, and from about 20 to about 40 weight percent of an ethylene-vinyl acetate copolymer having a vinyl acetate content of from 15 to about 40 weight percent and a melt index of from 0.5 to about 175.

13. The composition of claim 12 comprising substantially equal parts by weight of pitch, ethylene-acrylic acid copolymer and ethylene-vinyl acetate copolymer.

14. The composition of claim 1 comprising from about 25 to about 50 weight percent pitch having a softening point between about 100 and 150° C., and from about 50 to about 75 weight percent of an ethylene-vinyl acetate-acrylic acid terpolymer having a vinyl-acetate content of from about 15 to about 40 weight percent, an acrylic acid content of from about 2 to about 25 weight percent, and a melt index between about 5 and 60.

15. The composition of claim 1 wherein the carboxylic acid is maleic acid and the ethylene-vinyl acetate copolymer has a vinyl acetate content of from about 15 to about 40 weight percent and a melt index of from about 0.5 to about 175.

16. A protective tape useful for wrapping pipe comprising a 10 to 50 mil thick sheet of the composition of claim 1.

References Cited

UNITED STATES PATENTS

| | | | |
|---|---|---|---|
| 3,361,192 | 1/1968 | Parkinson | 260—28.5 AV |
| 3,298,855 | 1/1967 | Helin et al. | 117—76 P |

FOREIGN PATENTS

| | | | |
|---|---|---|---|
| 1,041,065 | 9/1966 | Great Britain | 260—897 B |

MORRIS LIEBMAN, Primary Examiner

H. H. FLETCHER, Assistant Examiner

U.S. Cl. X.R.

260—41 A, 41 B, 80.8, 897 B

UNITED STATES PATENT OFFICE
CERTIFICATE OF CORRECTION

Patent No. 3,814,712        Dated June 4, 1974

Inventor(s) George F. Snyder et al.

It is certified that error appears in the above-identified patent and that said Letters Patent are hereby corrected as shown below:

Column 5, line 73, "coatings" should read -- coating --.

Column 6, line 46, "agreate" should read -- aggregate --;

Table 5, under heading Ex. 25, the first three line state "23-2/3" they should read instead -- 23-1/3 --.

Signed and sealed this 29th day of October 1974.

(SEAL)
Attest:

McCOY M. GIBSON, JR.
Attesting Officer

C. MARSHALL DANN
Commissioner of Patents